United States Patent [19]

Thompson et al.

[11] 4,062,929

[45] Dec. 13, 1977

[54] PRODUCTION OF HYDROGEN FLUORIDE

[75] Inventors: William Henry Thompson; Ralph Eric Worthington, both of Dublin, Ireland; David John Stamper, Southampton, England

[73] Assignee: Fitzwilton Limited, Dublin, Ireland

[21] Appl. No.: 609,299

[22] Filed: Sept. 2, 1975

Related U.S. Application Data

[63] Continuation-in-part of Ser. No. 389,572, Aug. 20, 1973, abandoned.

[30] Foreign Application Priority Data

| Aug. 24, 1972 | United Kingdom | 39400/72 |
| Jan. 29, 1973 | United Kingdom | 4373/73 |
| Apr. 24, 1973 | United Kingdom | 19378/73 |
| May 21, 1973 | United Kingdom | 24149/73 |

[51] Int. Cl.$^2$ .................. C01B 7/22; C01B 33/12; C01C 1/16; C01D 3/02
[52] U.S. Cl. .................. 423/483; 423/339; 423/472; 423/470; 423/490
[58] Field of Search .............. 423/483, 484, 339, 472, 423/470, 490

[56] References Cited

U.S. PATENT DOCUMENTS

| 3,101,254 | 8/1963 | Cunningham | 423/483 |
| 3,195,979 | 7/1965 | Burkert et al. | 423/483 |
| 3,323,861 | 6/1967 | Toyabe et al. | 423/483 |

*Primary Examiner*—Edward Stern
*Attorney, Agent, or Firm*—William R. Liberman

[57] ABSTRACT

Hydrogen fluoride is produced from hydrofluosilicic acid. The hydrofluosilicic acid is reacted with ammonia. An aqueous solution of ammonium fluoride thus produced is fed with partly recycled alkali metal fluoride to a continuously operated reactor where a bifluoride of the alkali metal is formed in aqueous solution. Reaction mixture is continuously withdrawn and solid alkali metal bifluoride crystallized therefrom. The mother liquor is recycled to the reactor. The solid alkali metal bifluoride is decomposed by heat to produce hydrogen fluoride and solid alkali metal fluoride. The alkali metal fluoride is recycled to the reactor.

11 Claims, 4 Drawing Figures

PRODUCTION OF HYDROGEN FLUORIDE

This is a continuation in part of our Application Ser. No. 389,572, filed Aug. 20, 1973 (abandoned).

This invention relates to the production of hydrogen fluoride from hydrofluosilicic acid which is a by-product of the manufacture of phosphoric acid and superphosphates. More specificially, the fluorine is recovered from superphosphate den and phosphoric acid plant effluent gases.

The scrubber liquors from these plants contain hydrofluosilicic acid which can be made to react with ammonia as shown by the following well known reaction:

$$H_2SiF_6 + 6NH_3 + 2H_2O \rightarrow SiO_2 + 6NH_4F \quad (I)$$

The ammonia can be added to the liquors in liquid or gaseous form or in solution in water. Silica is precipitated as a solid and is separated from the liquor.

The liquors contain ammonium fluoride in solution which can be substantially converted to ammonium bifluoride by boiling. Complete conversion of the ammonium fluoride into ammonium bifluoride requires evaporation to dryness followed by a period of heating in excess of 120° C. This is shown by the following equations:

$$F^- + H_2O \rightleftharpoons HF + OH^- \quad (II)$$

$$NH_4^+ + OH^- \rightleftharpoons NH_3 + H_2O \quad (III)$$

$$F^- + HF \rightleftharpoons HF_2^- \quad (IV)$$

We have found that the conversion of the fluoride to bifluoride increases with increasing fluoride ion concentration and more specifically is facilitated by the presence of fluoride ions supplied by a soluble metal fluoride, especially an alkali metal fluoride such as potassium fluoride. In particular, we have found that solutions of ammonium fluoride on boiling with excess potassium fluoride give quantitative yields of potassium bifluoride with substantially complete removal of ammonia as a gas.

According to our invention, therefore, we provide a process for the production of hydrogen fluoride from ammonium fluoride comprising the reaction of ammonium fluoride to ammonia and hydrogen fluoride. The ammonium fluoride is heated in solution in the presence of a soluble metal fluoride, preferably in excess, which is capable of reaction with the hydrogen fluoride produced to form the bifluoride of the metal which can be isolated substantially free from ammonia by continuous crystallisation and is decomposable by heating to release hydrogen fluoride, allowing the soluble metal fluoride to be returned to the process.

In a preferred embodiment, the soluble fluoride is an alkali metal fluoride. In a specially preferred embodiment the soluble fluoride is potassium fluoride.

In our original application, stress was laid on the importance of a high weight ratio of fluoride ions to ammonium ions in solution. We can show, however, that the effect of the presence of the soluble metal fluoride is apparent at lower levels than indicated in our original application.

In a series of experiments, ammonium fluoride was hydrolysed in the presence of a soluble metal fluoride, in a continuously stirred tank reactor. Table 1 shows the effect of the ratio of fluoride to ammonium on the reaction rate (i.e. the rate of hydrolysis of the ammonium fluoride).

Table 1

| $NH_4^+$ (mole ratio) MR | $[F^-]/[NH^+]$ (weight ratio) WR | Reaction Rate (g.moles/litre/hour) | Temp. °C |
|---|---|---|---|
| 1.72 | 1.92 | 0.37 | 120 |
| 2.11 | 2.36 | 2.1 | 120 |
| 2.8 | 3.13 | 3.2 | 120 |
| 3.55 | 3.97 | 3.9 | 120 |

We have now found that the reaction proceeds effectively when the weight ratio of fluoride ion to ammonium ion in solution is as low as 1.9 (1.7 mole ratio). Although the reaction is slower when the fluoride ion to ammonium ion mole ratio is 1.7, the rate of reaction can be tolerated within the design limitations of a commercial plant.

When the metal bifluoride is separated from the reaction medium, it is clear that the ratio of the quantity of metal fluoride to the quantity of ammonium fluoride being fed to the reactor must be such that they are at least in stoichiometric proportions, as the mole ratio of $F^-$ to $NH_4^+$ must be at least 2:1 (wt. ratio 2.24:1). The conditions in the reaction medium are in no way limited to this minimum ratio and hence we have been able to obtain hydrolysis of the ammonium fluoride at a mole ratio of 1.7.

In the preferred embodiment where potassium fluoride is used, both the weight ratio of potassium fluoride to potassium bifluoride in solution and the filtration temperature employed govern the relative amounts of KF and $KHF_2$ in the crystallised solids.

It is possible, by adjusting the KF:$KHF_2$ ratio in solution and the filtration temperature, to recover solids ranging widely in $KHF_2$ content, e.g. from 95% to 35%.

The excess of KF fed to the reactor over the stoichiometric quantity which is required to react with the ammonium fluoride fed to the reactor is determined by the $KHF_2$ content of the recovered solid. If 100% pure $KHF_2$ were recovered, no excess of KF would be required to be fed to the reactor.

The presence of a substantial amount of KF in the recovered solids can be advantageous in the operation of the final stage of the process, as shown below in connection with a specific embodiment of the invention where there is a direct decomposition of the potassium bifluoride solids. In particular, the presence of KF minimises the melting of the solids in the kiln. In another embodiment of the invention it is preferable to operate with high bifluoride levels in the filtered solids as will be seen below in the specific description of the process.

The reaction of ammonium fluoride with potassium fluoride in aqueous solution occurs at significant rates at temperatures above 30° C. At lower temperatures the reaction is slow. In the process as described, it is necessary to remove water continuously from the system. There is therefore a preference for carrying out the reaction at the boiling point. We can, however, work in practice at temperatures of from 70° C. up to the boiling point of the solution which is generally between 120° C and 130° C. The crystallised solids may be removed by cooling the hot reactor outflow to a suitable temperature, separating the crystalliser solids from the liquors and returning the liquors to the reactor.

Alkali metal bifluorides lose hydrofluoric acid on heating. Potassium bifluoride is quantitatively decomposed at temperatures in excess of 400° C. Sodium bifluoride is decomposed at temperatures in excess of 250° C. It is therefore a preferred embodiment of our process to convert the potassium bifluoride to sodium bifluoride by reaction with sodium fluoride, before decomposition to hydrogen fluoride. The sodium fluoride produced is recycled to the process. The exchange reaction may be carried out by slurrying a solution of potassium bifluoride with solid sodium fluoride or by slurrying solid potassium bifluoride with solid sodium fluoride and water. The vessel in which the slurrying process is carried out is called the exchange reactor to distinguish it from the main reactor in which the hydrolysis reaction is performed.

Hydrofluosilicic acid recovered by scrubbing the off-gases of phosphate plants generally has a $P_2O_5$ content in the range of from 0.1 to 3.0% owing to carryover of entrained phosphoric acid droplets and rock phosphate dust. While there are commercial processes available to reduce the $P_2O_5$ level of the hydrofluosilicic acid to as low as 0.01%, we prefer to prevent the build up of the phosphate level in the system by treatment with ammonia of a portion of the recycle stream from the alkali metal bifluoride separator to the main reactor. The $P_2O_5$ precipitates as tri-ammonium phosphate and the sulphate as ammonium sulphate. The precipitates are separated from the liquors which are returned to the main reactor.

The presence of large proportions of alkali metal fluoride e.g. potassium fluoride, in the bifluoride mass minimises melting and reduces sintering during decomposition in the kiln. As described above, the KF content of the reactor product solids can be adjusted by varying the ratio of $KHF_2$ to KF in the reactor solution and the filtration temperature. Solids containing a substantial amount of either sodium fluoride or lithium fluoride may be employed during the decomposition in the kiln, both these salts being present in the system largely as undissolved solids. After decomposition, the mass containing potassium fluoride together with sodium or lithium fluoride can be recycled to the reaction vessel for re-use in the process.

If desired, the potassium fluoride may be separated from the sodium or lithium fluoride in the mass by leaching with water. The dissolved potassium fluoride may be returned to the reactor and the residual solid, which comprises sodium or lithium fluoride may be sent to the dryer where it may be mixed with the reactor product solids.

For a better understanding of the invention reference is now made to the accompanying drawings, in which.

Figure 1:
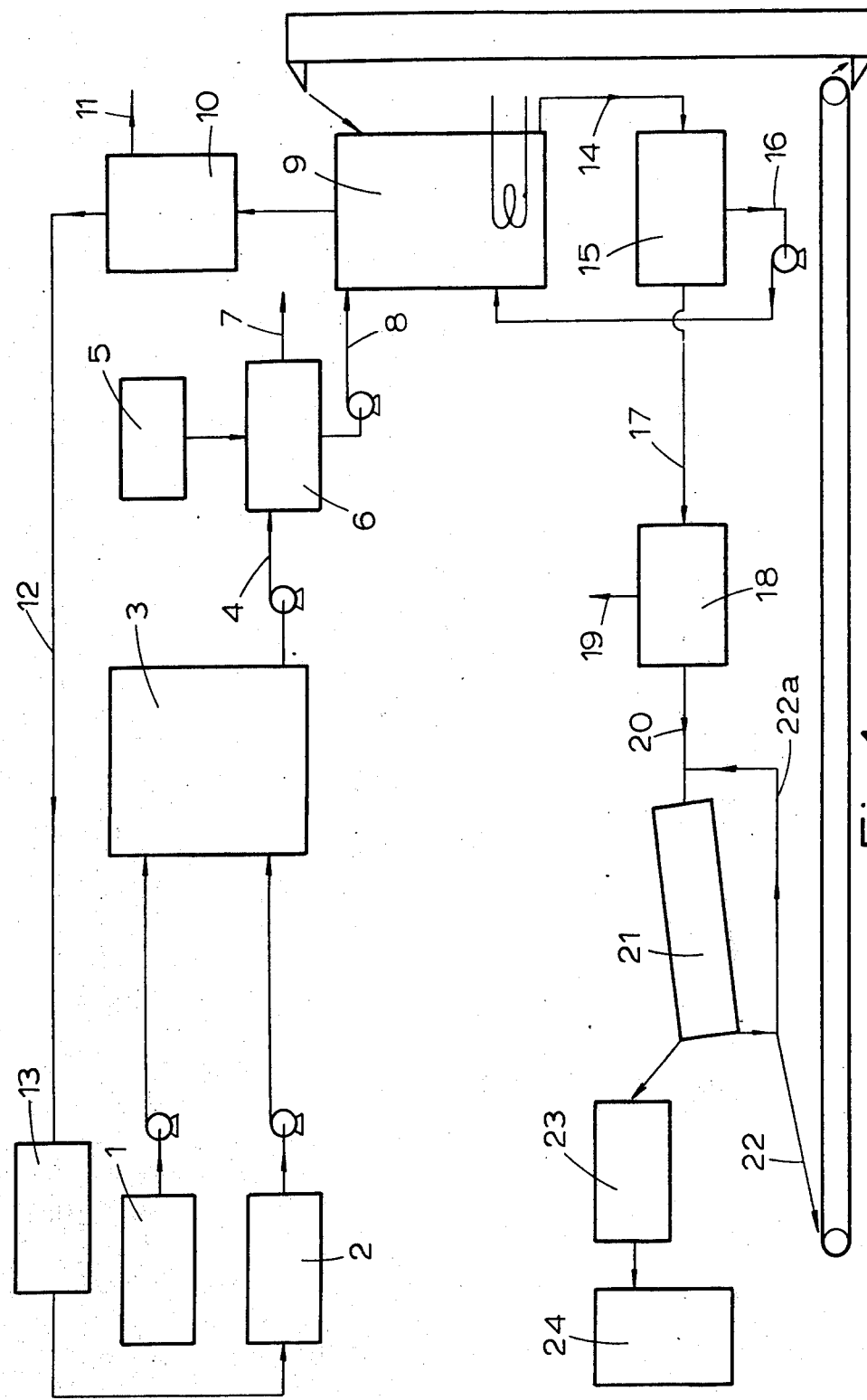
FIG. 1 is a flow sheet of one embodiment of the process according to the invention for the recovery of hydrogen fluoride from hydrofluosilicic acid.

The apparatus diagrammatically indicated in FIG. 1 comprises a source 1 of hydrofluosilicic acid and a source 2 of ammonia, followed by an ammoniator 3, a silica filter 6, a reactor 9, and an ammonia stripper 10.

A crystalliser/filter 15 is followed by a drier 18, a kiln 21 for the removal of hydrofluoric acid, a purification system 23 and a storage tank 24 for the purified hydrofluoric acid.

The apparatus may be operated as follows.

Hydrofluosilicic acid and ammonia are reacted in the ammoniator 3 and the resulting aqueous ammoniacal slurry is fed through the conduit 4 to the filter 6. The separated solid silica is washed with water supplied at 5 and removed from the system at 7.

The collected filtrate 8, which consists essentially of an aqueous ammoniacal solution of ammonium fluoride, is fed to the reactor 9 together with recycled filtrate 16 from the filter 15 and recycled potassium fluoride 22 from the kiln 21. Water vapour and ammonia are removed from the reactor 9 by maintaining the contents of the reactor at the boiling point of the solution, i.e. approximately 125° C. The water vapour/ammonia mixture is separated in the ammonia stripper 10, the gaseous ammonia being fed along the conduit 12 to the compressor 13 and thence to the ammonia storage vessel 2. The water is carried via the conduit 11 back to the scrubbing system. The rate of boiling in the reactor 9 is adjusted so that the rate of removal of the water vapour is essentially equal to the rate of the addition of water to the reactor 9 in the stream 8.

The outflow from the reactor 9 passes through the conduit 14 into the crystalliser/separator 15, the solid 17 being separated and then dried in the drier 18. As mentioned above, the separated liquors are returned to the reactor via the conduit 16. The water removed from the solid 17 in the drier 18 is vented to the scrubber via the conduit 19.

The dry solid 20 is fed into the kiln 21, hydrofluoric acid is passed through the purification system 23, and pure hydrofluoric acid is collected at 24. The residue of potassium fluoride in the kiln is recycled to the reactor via the conveyor system 22. Part may be recycled to the kiln as shown at 22a.

According to a further embodiment of the process, the concentration of ammonium fluoride in the stream 8 which is fed to the reactor 9 may be increased by recovering some or all of the hydrofluosilicic acid from effluent gases from a phosphoric acid plant or a super-phosphate den in the form of ammonium fluosilicic by introducing ammonia into the hydrofluosilicic acid scrubbing water. This may be achieved by using some or all of the liquor from the scrubbing system in the hydrofluosilicic acid recovery system, or by adding ammonia directly to the hydrofluosilicic acid recovery system or, by any combination of these two possibilities.

Figure 2:
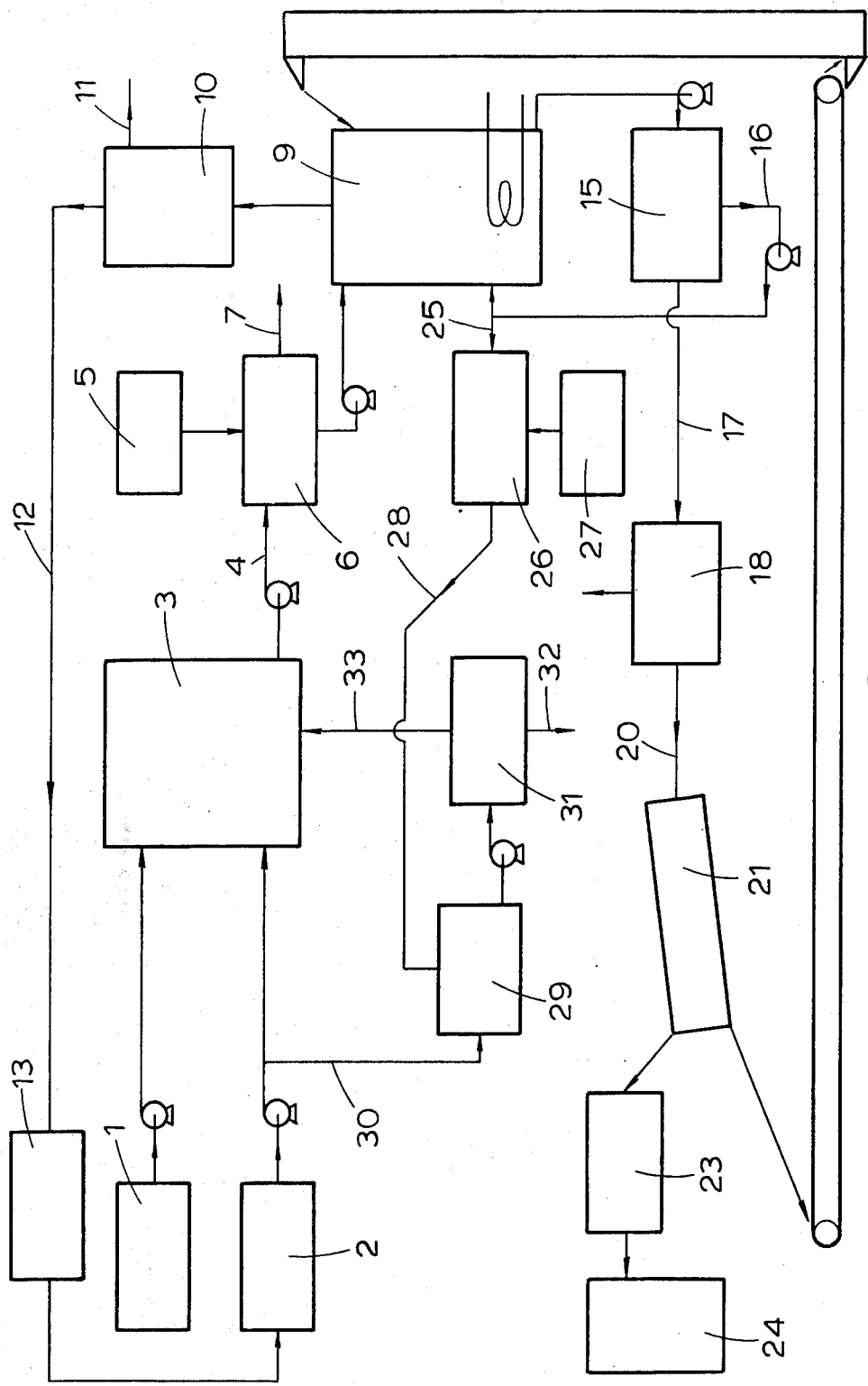
FIGS. 2 and 3 are flow-sheets of modifications of this process.

A scheme for preventing a build up of $P_2O_5$ in the system is shown in FIG. 2. A portion of the recycle stream 16 is bled off through the conduit 25 and mixed with sufficient water in the cooler 26 to form a homogeneous solution at 30°–40° C. The homogeneous solution is passed via the conduit 28 to the pressure vessel 29 and liquid ammonia is added via the conduit 30 to give a pressure of about 4 atmosphere. The tri-ammonium phosphate and ammonium sulphate are separated from the liquors and removed at 32 and the liquors are passed through a conduit 33 to the ammoniator 3.

Figure 3:
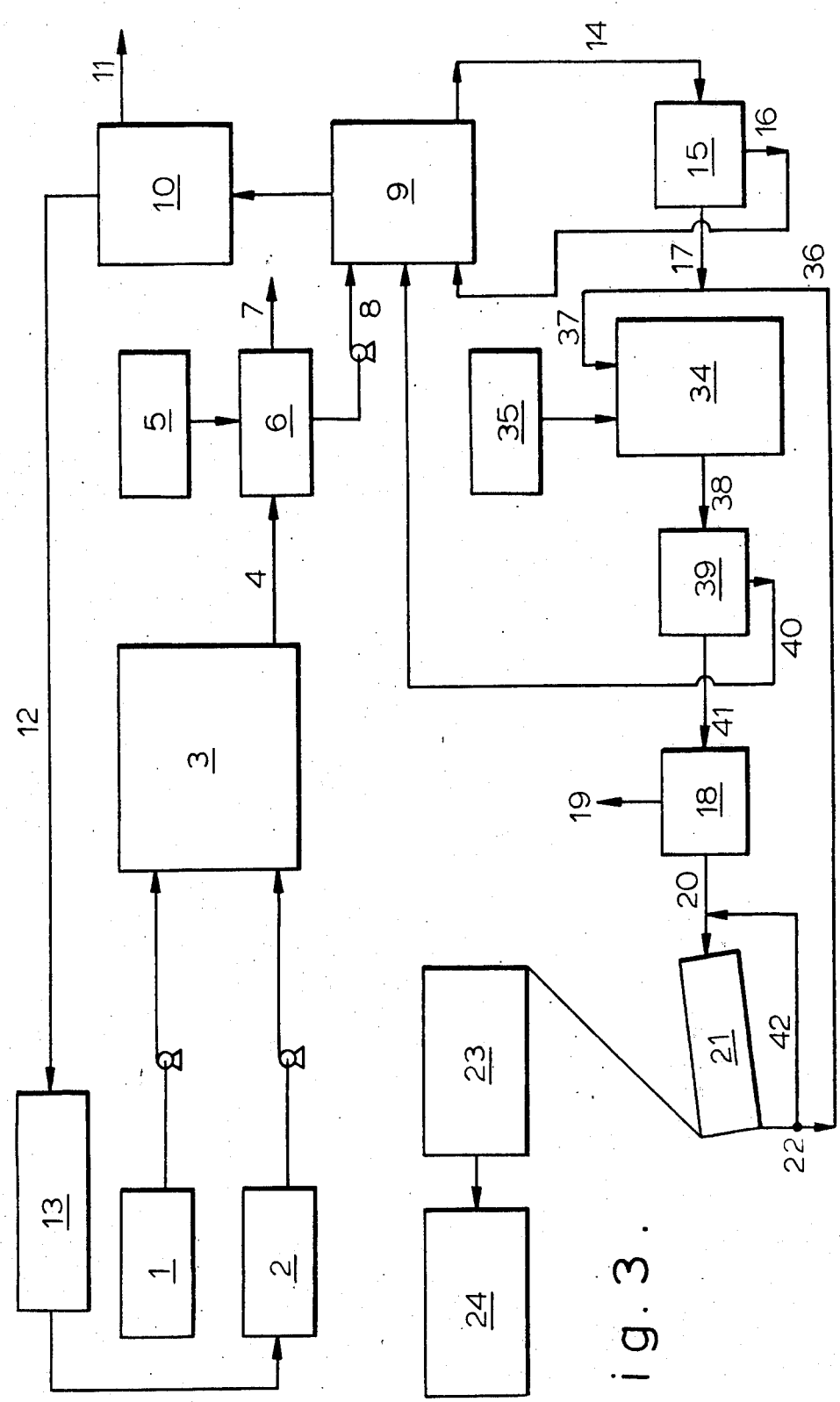

Instead of the direct decomposition of $KHF_2$ into KF + HF, the $KHF_2$ may be converted into $NaHF_2$ using NaF. The sodium bifluoride is then decomposed at a lower temperature than is possible with potassium bifluoride. This scheme is shown diagrammatically in FIG. 3.

The process is similar to that in FIG. 1 up to the point where solid $KHF_2$ 17 is separated from the reactor liquors 14, at Separator 15. The solid $KHF_2$ 17 is slurried with NaF 36 recycled from the kiln and water provided at 35 in the exchange reactor 34. The reaction mixture 38 is separated at 39 into a solid fraction 41, and a liquor fraction 40. The latter, containing mainly KF and $KHF_2$ in aqueous solution, is returned to the main reactor 9 for the hydrolysis of $NH_4F$ described previously. The solids 41, substantially consisting of $NaHF_2$ with some NaF, are dried at 18, the water vapour being removed at 19. The dry solids 20 are passed to the kiln 21 where HF is evolved, purified at 23, and stored at 24. The NaF residue from the kiln is returned to the exchange reactor 34. Some NaF may be recycled to the kiln feed at 42.

Figure 4:
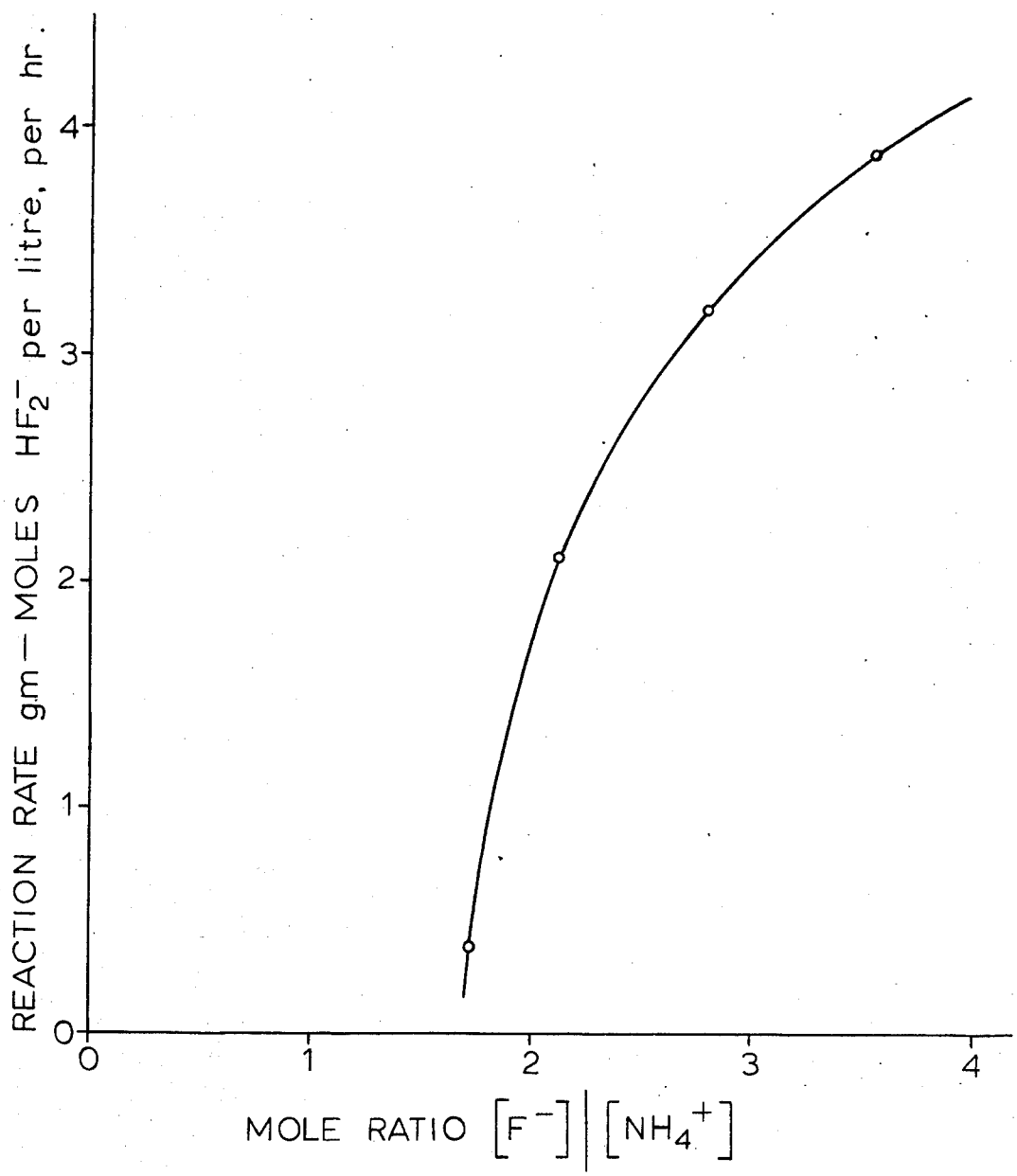
FIG. 4 is a graph illustrating the hydrolysis stage.

The graph in FIG. 4 illustrates the hydrolysis stage, and shows the effect of the mole ratio of fluoride ions to ammonium ions on the reaction rate.

The invention is illustrated by the following experiments and examples in which all the quantities given are by weight unless otherwise stated.

EXPERIMENT 1

This experiment illustrates the effect of increasing the fluoride ion concentration upon the initial rate of hydrolysis of ammonium fluoride in aqueous solution at the boiling point.

The increased rate of hydrolysis of ammonium fluoride in aqueous solution produced by increasing the fluoride ion concentration is illustrated below. Variations in the total fluoride ion concentration were effected by the addition of anhydrous potassium fluoride.

The reaction mixtures were prepared by adding the required amounts of anhydrous potassium fluoride to 50 ml of approximately 7 molar ammonium fluoride solution, diluting to 100 ml with water and reacting at the boiling point for the required length of time. Water was added as required to maintain the volume of reacting solution at about 100 ml.

The extent of reaction was followed both by titration of aliquots of the reaction mixture with standard alkali and by monitoring the ammonium ion concentration in the solutions. Good agreement was obtained between the two methods.

Typical results are shown below.

| Sample A: no KF added | Initial $F^-/NH_4^+$ ratio = 1.0 |
|---|---|
| Sample B: 21.0 g KF added | Initial $F^-/NH_4^+$ ratio = 2.0 |
| Sample C: 42.0 g KF added | Initial $F^-/NH_4^+$ ratio = 3.0 |
| Sample D: 63.0 g KF added | Initial $F^-/NH_4^+$ ratio = 4.0 |

| Sample | % $NH_4F$ decomposed after | | | | |
|---|---|---|---|---|---|
| | 5 | 10 | 15 | 30 | 60 minutes |
| A | 7.1 | 10.6 | 11.9 | 15.0 | 19.9 |
| B | 13.8 | 20.4 | 29.1 | 44.3 | 50.7 |
| C | 22.5 | 44.0 | 58.8 | 74.2 | 83.4 |
| D | 40.5 | 52.7 | 81.1 | 90.6 | 97.8 |

EXPERIMENT 2

This experiment illustrates the effect of the initial $F^-/NH_4^+$ ratio upon the limiting conversion of ammonium fluoride into ammonia and hydrogen fluoride in aqueous solution.

Samples A, B and D described in Experiment 1 were reacted at the boiling point until the rate of the reaction dropped to an insignificant level (viz. no detectable increase in the extent of conversion of the ammonium fluoride during a time interval of 15 minutes).

| Sample | Initial $F^-/NH_4^+$ ratio | % decomposition of $NH_4F$ at limiting conversion |
|---|---|---|
| A | 1.0 | 35 |
| B | 2.0 | 66 |
| D | 4.0 | >98 |

EXPERIMENT 3

This experiment illustrates the retarding effect of bifluoride ions on the rate of decomposition of ammonium fluoride in aqueous solution.

The effect of the addition of potassium bifluoride to Sample D (0.66 moles $KHF_2$ per mole of anhydrous potassium fluoride) has confirmed that $HF_2^-$ ions (which are formed during the decomposition of the ammonium fluoride) retard the rate of reaction but most probably do not substantially affect the limiting conversion.

| Sample | % decomposition of $NH_4F$ after | | | |
|---|---|---|---|---|
| | 10 | 15 | 30 | 60 minutes |
| D | 52.7 | 81.1 | 90.6 | 97.8 |
| D+$KHF_2$ | 32.3 | 52.6 | 71.8 | 88.5 |

There now follow specific examples of the invention in which the apparatus shown in the drawings was used.

EXAMPLE I

The apparatus of FIG. 1 was used. 1000 parts by weight of aqueous fluosilicic acid (16% $H_2SiF_6$) were reacted with gaseous ammonia until a pH of 9 was reached. The silica which precipitated was removed by filtration and washed twice with water (2 × 75 parts). Th filtrate of ammonium fluoride solution (1190 parts containing 20.5% by weight of ammonium fluoride) was fed to a reactor and 855 parts of water and 1150 parts of anhydrous potassium fluoride were added. The reaction mixture was heated to boiling point, the rate of heating being adjusted so as to evaporate off an amount of water substantially equivalent to that added in the ammonium fluoride stream in 1 hour. Gaseous ammonia was rapidly evolved from the boiling reaction mixture, and after separation from the water vapour concurrently being removed from the reaction mixture, it was used to ammoniate a further batch of hydrofluosilicic acid.

After a reaction time of 1 hour, the reaction mixture was cooled to 20° C causing a white crystalline solid to separate out. The solid was removed by filtration and then dried at 150° C. Analysis showed the solid to consist of 87.5% by weight of potassium bifluoride, 12.0% by weight of potassium fluoride and less than 0.02% by weight of ammonium fluoride. The filtrate (1570 parts) containing 714 parts of potassium fluoride, 41 parts of potassium bifluoride and 5 parts of ammonium fluoride, was recycled to the reactor.

The dry solid (520 parts) was decomposed in a kiln at 400° C to yield anhydrous potassium fluoride (403 parts) and anhydrous hydrogen fluorided (117 parts). The anhydrous potassium fluoride was recycled to the reactor.

EXAMPLE II

The procedure was as described in Example I but the addition of 855 parts water to the reactor was replaced by recycled filtrate, and the addition of 1150 parts anhydrous potassium fluoride was replaced by recycled anhydrous potassium fluoride.

After drying at 150° C, 596 parts of crystalline solid were obtained consisting of 81.3% by weight of potassium bifluoride, 18.0% by weight of potassium fluoride and less than 0.02% by weight of ammonium fluoride. After removal of the crystalline solid by filtration, the filtrate (1450 parts), containing 645 parts potassium fluoride, 44 parts potassium bifluoride and 15 parts ammonium fluoride, was recycled to the reactor.

Decomposition of the crystalline solid in a kiln at 400° C produced 124 parts of anhydrous hydrogen fluoride and 472 parts of anhydrous potassium fluoride. The potassium fluoride was recycled from the kiln to the reactor.

EXAMPLE III

The procedure was as described in Example I but the water added to the reactor was reduced to 475 parts.

After a reaction time of 1 hour, the contents of the reactor were cooled to 70° C and the crystalline solid which formed was removed by filtration. 477 parts of solid, consisting of 68.5% of potassium bifluoride, 31.2% potassium fluoride and less than 0.02% ammonium fluoride, were obtained after drying at 150° C. The filtrate (1277 parts), containing 636 parts potassium fluoride, 163 parts potassium bifluoride and 3 parts ammonium fluoride, was recycled to the reactor.

The dry solid was decomposed in a kiln at 400° C to yield 83 parts of anhydrous hydrogen fluoride, the residue of anhydrous potassium fluoride being recycled to the reactor.

EXAMPLE IV

The apparatus of FIG. 1 was again used. An aqueous ammonium fluoride solution prepared as described in Example 1 was fed continuously into an 8 liter reactor together with recycled filtrate and anhydrous potassium fluoride recycled from the kiln. The contents of the reactor were maintained at the boiling point, the rate of heating being such that water was removed from the system at the same rate as it was being added in the ammonium fluoride system. The ammonia evolved from the reactor was recovered and used to ammoniate a further batch of hydrofluosilicic acid.

In the reaction mixture, the weight percentage of fluoride ions relative to ammonium ions was maintained at substantially 4:1 and that of fluoride ions relative to bifluoride ions was maintained at substantially 1.5:1. This was done by adjusting the rates of addition of the ammonium fluoride solution and the recycled filtrate. Suitable rates of addition were found in practice to be 5.2 and 6.4 liters per hour, respectively.

A crystalline solid analysed to be substantially 80% potassium bifluoride was recovered at a rate of 3.03 kilogrammes per hour by cooling the outflow from the reactor to 70° C, filtering and finally drying the solid at 150° C. The filtrate was recycled continuously to the reactor. After drying, the crystalline product was decomposed in a kiln at 400° C to yield anhydrous hydrogen fluoride (0.60 kilogrammes per hour) and potassium fluoride, the potassium fluoride being recycled continuously to the reactor.

EXAMPLE V

An aqueous solution of ammonium fluoride and potassium fluoride was fed to a heated continuously stirred tank reactor of volume 3.65 liters at a rate of 1.04 liters/hour. The solution was obtained by ammoniation of aqueous hydrofluosilicic acid, removal of the silica formed and dissolving solid potassium fluoride in the resultant liquor. The composition of the solution was: ammonium fluoride 1.36 gram moles per liter; ammonia 0.20 gram moles/liter; potassium fluoride 1.51 gram moles/liter. Vapours evolved from the reactor were condensed and the condensed liquid flow rate was 1.05 liters/hour. It contained 1.30 gram moles per liter of ammonia.

The overflow from the reactor was at the rate of 0.87 liters per hour and contained 3.71, 2.67 and 2.49 gram moles/liters of ammonium fluoride, potassium fluoride and potassium bifluoride respectively.

The outflow was cooled and the crystallised solid was removed by filtration. The filtrate was returned to the reactor at the rate of 0.693 liters/hour. Its composition was 4.58, 3.04 and 1.16 gram moles/liter of ammonium fluoride, potassium fluoride and potassium bifluoride respectively.

Thus the rate of production of bifluoride was 1.360 gram moles/hour (0.37 gram moles/hour per liter of reactor volume). The mole ratio of fluoride ion to ammonium ion in aqueous solution was 1.72:1. In further experiments performed in similar fashion, the results shown in Table 1 were obtained. These results are shown as a graph in FIG. 4.

We claim:

1. A process for the production of the hydrogen fluoride from hydrofluosilicic acid comprising the following steps:
   a. reacting ammonia with hydrofluosilicic acid to produce an aqueous solution of ammonium fluoride and a precipitate of silica, and separating said silica from said aqueous solution of ammonium fluoride;
   b. feeding said aqueous solution of ammonium fluoride obtained in step (a) with an alkali metal fluoride, at least partly recycled from step (e), to a continuously operated reactor, wherein said ammonium fluoride and said alkali metal fluoride react to form a bifluoride of said alkali metal in aqueous solution;
   c. continuously withdrawing reaction mixture from said reactor in step (b), crystallising therefrom a solid product comprising alkali metal bifluoride substantially free from ammonium fluoride, and recycling the mother liquor to said reactor in step (b), the mother liquor comprising a solution of ammonium fluoride, alkali metal fluoride and alkali metal bifluoride thereby obtaining substantially complete conversion of the ammonium fluoride fed to said reactor in step (b) from step (a);
   d. drying said solid alkali metal bifluoride obtained in step (c) and decomposing at least part of it by heat to produce substantially pure hydrogen fluoride gas and solid alkali metal fluoride; and
   e. recycling said alkali metal fluoride produced in step (d), together with undecomposed alkali metal bifluoride from step (d), to the reactor in step (b).

2. A process according to claim 1, in which the conditions of the ammonium fluoride reaction at step (b) are controlled so that the bifluoride ions produced are recoverable from solution as a mixture of alkali metal fluoride and alkali metal bifluoride, in consequence of which said alkali metal fluoride fed to said reactor at step (b) from step (e) is in excess of the amount required to react with said ammonium fluoride fed to said reactor from step (a), the amount of the excess being determined by the proportion of alkali metal fluoride removed with said solid alkali metal bifluoride.

3. A process according to claim 1, in which the reaction at step (b) is carried out at the boiling point of the reaction mixture thereby facilitating the removal of ammonia and water from said reaction mixture.

4. A process according to claim 1, in which the molar ratio of fluoride ions to ammonium ions in the reaction mixture at step (b) is maintained 1.7.

5. A process according to claim 1, in which said solid alkali metal bifluoride is crystallised and separated at a temperature of from 20° to 70° C.

6. A process for the production of hydrogen fluoride from hydrofluosilicic acid comprising the following steps:
   a. reacting ammonia with hydrofluosilicic acid to produce an aqueous solution of ammonium fluoride and a precipitate of silica, and separating said silica from said aqueous solution of ammonium fluoride;
   b. feeding said solution of ammonium fluoride obtained in step (a), and an aqueous mother liquor solution obtained in steps (c) and (d) to a continuously operated reactor, wherein said ammonium fluoride and said potassium fluoride react to form potassium bifluoride in aqueous solution;
   c. continuously withdrawing reaction mixture from said reactor in step (b), crystallising therefrom a solid product comprising potassium bifluoride and separating from the mother liquor said solid product substantially free from ammonium fluoride, and recycling the mother liquor to said reactor in step (b), the mother liquor comprising a solution of ammonium fluoride, alkali metal fluoride and alkali metal bifluoride, thereby obtaining substantially complete conversion of the ammonium fluoride fed to said reactor in step (b) from step (a);
   d. mixing at least part of said solid potassium bifluoride obtained at step (c) with sodium fluoride recycled from step (f), in the presence of water in a reactor to form solid sodium bifluoride and an aqueous solution of potassium fluoride, separating said solid sodium bifluoride from the mother liquor, and recycling said mother liquor to said reactor at step (b);
   e. drying said solid sodium bifluoride from step (d) and decomposing at least part of it by heat to produce substantially pure hydrogen fluoride gas and solid sodium fluoride; and
   f. recycling said solid sodium fluoride produced at step (e), together with undecomposed sodium bifluoride from step (e), to said reactor at step (d).

7. A process according to claim 6, in which the conditions of the ammonium fluoride reaction at step (b) are controlled so that the bifluoride ions produced are recoverable from solution as a mixture of potassium fluoride and potassium bifluoride, in consequence of which the potassium fluoride fed to said reactor at step (b) from step (d) is in excess of the amount required to react with said ammoniuly fluoride fed to said reactor from step (a), the amount of the excess being determined by the proportion of potassium fluoride removed with said solid potassium bifluoride.

8. A process according to claim 6, in which the reaction at step (b) is carried out at the boiling point of the reaction mixture, thereby facilitating the removal of ammonia and water from said reaction mixture.

9. A process according to claim 6, in which said solid sodium bifluoride produced at step (d) is produced as a mixture of sodium bifluoride and sodium fluoride.

10. A process according to claim 6, in which said aqueous solution of potassium fluoride produced at step (d) also contains potassium bifluoride, said aqueous solution being recycled to said reactor at step (b).

11. A process for the production of the hydrogen fluoride from hydrofluosilicic acid comprising the following steps:
   a. reacting ammonium with hydrofluosilicic acid to produce an aqueous solution of ammonium fluoride and a precipitate of silica, and separating said silica from said aqueous solution of ammonium fluoride;
   b. feeding said aqueous solution of ammonium fluoride obtained in step (a) with a potassium fluoride, at least partly recycled from step (e), to a continuously operated reactor, wherein said ammonium fluoride and said potassium fluoride react to form a potassium bifluoride in aqueous solution;
   c. continuously withdrawing reaction mixture from said reactor in step (b) crystallising therefrom a solid product comprising potassium bifluoride substantially free from ammonium fluoride, and recycling the mother liquor to said reactor in step (b), the mother liquor comprising a solution of ammonium fluoridie, alkali metal metal fluoride and alkali metal bifluoride, thereby obtaining substantially complete conversion of the ammonium fluoride fed to said reactor in step (b) from step (a);
   d. drying said solid potassium bifluoride obtained in step (c) and decomposing at least part of it by heat to produce substantially pure hydrogen fluoride gas and solid potassium fluoride; and
   e. recycling said potassium fluoride produced in step (d), together with undecomposed potassium bifluoride from step (d), to the reactor in step (b).

* * * * *

UNITED STATES PATENT OFFICE
CERTIFICATE OF CORRECTION

Patent No. 4,062,929  Dated December 13, 1977

Inventor(s) William Henry Thompson et al.

It is certified that error appears in the above-identified patent and that said Letters Patent are hereby corrected as shown below:

The term of this patent subsequent to December 13, 1994 has been disclaimed.

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*